(12) United States Patent
Skopp et al.

(10) Patent No.: US 6,256,739 B1
(45) Date of Patent: *Jul. 3, 2001

(54) METHOD AND APPARATUS TO DETERMINE USER IDENTITY AND LIMIT ACCESS TO A COMMUNICATIONS NETWORK

(75) Inventors: Peter Skopp; Benjamin F. Vitale, both of New York, NY (US); Vinod R. Marur, Ridgefield, CT (US); Clifford S.C. Tse; Dharmender S. Dulai, both of New York, NY (US)

(73) Assignee: Juno Online Services, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,313

(22) Filed: Nov. 26, 1997

Related U.S. Application Data

(60) Provisional application No. 60/064,365, filed on Oct. 30, 1997.

(51) Int. Cl.⁷ ............................. G06F 11/30; H04L 9/00
(52) U.S. Cl. ........................................ 713/201; 709/229
(58) Field of Search ..................... 713/201, 200, 713/202; 709/225, 229; 380/2, 3, 4, 23, 25; 340/825.31, 825.32

(56) References Cited

U.S. PATENT DOCUMENTS

| | | | |
|---|---|---|---|
| 4,799,153 | * 1/1989 | Hann et al. | 380/25 X |
| 5,072,441 | 12/1991 | Szwarc | 370/60 |
| 5,241,594 | 8/1993 | Kung | 380/4 |
| 5,257,369 | * 10/1993 | Skeen et al. | 395/650 |
| 5,499,297 | 3/1996 | Boebert | 380/23 |
| 5,560,008 | * 9/1996 | Johnson et al. | 395/650 |
| 5,577,209 | * 11/1996 | Boyle et al. | 395/200.06 |
| 5,715,823 | * 2/1998 | Wood et al. | 128/660.01 |
| 5,781,623 | 7/1998 | Khakzar | 379/230 |
| 5,809,242 | * 9/1998 | Shaw et al. | 395/200.47 |

FOREIGN PATENT DOCUMENTS 59-20057  11/1984  (JP) ............................. A01K/87/00

OTHER PUBLICATIONS

Charles A. Gimon, "Singapore's Proxy Experiment," InfoNation (1996) (http://www.info-nation.com/singapore.html).
SurfWatch Products and Filtering Criteria (http://www.surfwatch.com/products/).
The Cyber Patrol Fact Sheet (http://www.microsys.com/cyber/fact.htm).
Juno Advertisement, Advertising Age, Nov. 10, 1997.
Catherine P. Taylor, "Juno Rejiggers Ads to Include the Web," Brandweek, p. 58, Nov. 3, 1997.
William S. Galkin, "Your Clickstream is Showing," Cyberspace Lawyer, p. 11, Jun. 1997.

* cited by examiner

Primary Examiner—Dieu-Minh T. Le
(74) Attorney, Agent, or Firm—Kenyon & Kenyon

(57) ABSTRACT

A method and apparatus to determine user identity and limit access to a communications network. A first message containing user identity information is received from a client computer in accordance with a first protocol. A first network address is determined from the first message. A second message containing an information request is also received from the client in accordance with a second protocol, and a second network address is determined from the second message. The requesting user identity is then determined based on the first network address, the user identity information and the second network address. Based on the requesting user identity, it can be decided whether to grant the information request. If access is granted, the requested information is retrieved using the communications network.

31 Claims, 6 Drawing Sheets

METHOD AND APPARATUS TO DETERMINE USER IDENTITY AND LIMIT ACCESS TO A COMMUNICATIONS NETWORK

CROSS-REFERENCE TO RELATED APPLICATIONS

This application claims the benefit of U.S. Provisional Application No. 60/064,365, filed Oct. 30, 1997, entitled "Method and Apparatus for Limiting Access to a Communications Network Using a Proxy," and the subject matter of the present application is related to the subject matter of U.S. Pat. No. 5,809,242 entitled "Electronic Mail System for Displaying Advertisement at Local Computer Received From Remote Site While the Local Computer is Off-Line the Remote System" to David E. Shaw, Charles E. Ardai, Brian D. Marsh, Dana B. Rudolph, Jon D. McAuliffe and Mark A. Moraes and assigned to Juno Online Services, L.P., the entire disclosures of which are hereby incorporated by reference.

FIELD OF THE INVENTION

The invention relates to the transmission of information in a communications network. More particularly, the invention relates to a method and apparatus to determine user identity and limit access to a communications network.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

A packet-based communications network (packet network) can transmit a data stream of bits in the form of packets of fixed or variable length for the purpose of moving information between computers. Each packet can be routed by address information contained in the data stream. Typically, one accesses a packet network through a client program executing on a personal computer (PC). There are approximately 30 million users of packet networks in the U.S. The Internet (the largest and most well-known of the existing packet networks) connects millions of computers in countries across the world. The World Wide Web represents a portion of the information on the Internet accessible through graphical user interface software (typically called a Web browser or browser). In addition to the Internet, many companies use packet networks, locally or internally within the company, which are modeled in functionality based upon the Internet. These packet networks, denoted "intranets" or "extranets," are compatible with the Internet Protocol (IP), a communications protocol that handles the address part of each data packet that is transmitted from one computer to another on the Internet.

A communications network, such as the Internet, can transmit pages of information to a user's computer for display. One example of such an information page is used in the World Wide Web (also called simply the "Web"), which stores and transmits information pages over the Internet using the Hyper Text Markup Language (HTML) transmitted via Hyper Text Transfer Protocol (HTTP). The information that comprises a Web page on the Internet typically resides on a computer known as a server, which is accessed through the Internet by a person utilizing a computer, such as a PC. In general, a Web page can include combinations of text, graphics, sound, video and small application programs. A Web page can also include a "link" which, when selected by a user, results in the automatic display of another Web page. A group of related Web pages connected by these links is sometimes referred to as a Web "site."

Each file of information on the Web is given a name, called a Uniform Resource Locator (URL), that a browser uses to request a file. The URL is essentially a location that can represent an entire Web page, an image file or any other type of file supported by HTML. The Netscape Navigator™ browser, available from Netscape Communications Corporation in Mountain View, Calif., is one example of a browser that can request URLs and display Web pages to a user. Typically, a user at a PC will access the Internet by establishing a communications link with, or "logging onto," an Internet Service Provider (ISP), perhaps over a telephone line using a modem. When the user requests a Web page, the user's browser communicates with the Internet through the ISP to retrieve the information related to the requested URL.

Increasingly, businesses are establishing Web sites as a means of providing information to and attracting potential customers, and Web sites are emerging as an important tool for advertising. One may locate a company's Web site by, e.g., using one of a number of existing search engines available over the Internet, or browsing other Web sites containing links to the company's Web site, or directly entering the URL. Typically, Web browsing takes place in the context of an interactive communication session, where one may, for example, direct the Web browsing session by choosing to follow hypertext links found in Web sites and/or may respond to information located at various Web sites.

Businesses seeking to attract potential customers obviously want as many consumers as possible to view their advertisement Web pages. Many consumers, however, do not view advertisement Web pages due to the expense of accessing the Internet. An ISP typically generates revenue by charging a fee for providing access to the Internet, and the fees, which can be quite substantial, have been beyond the reach of many consumers. Therefore, some consumers have not had access to the Internet and are unable to view an advertiser's Web page.

Even if an advertiser or ISP wanted to provide free access to the Internet, or access at a reduced cost, to let more consumers view advertisement Web pages, consumers would likely spend a lot of time viewing Web pages unrelated to the advertisements. Without a way of granting access to a limited and pre-determined portion of the Web, namely selected advertisements, supporting consumer access to the Internet would be prohibitively expensive for the advertiser or ISP.

Moreover, an advertiser might prefer to grant access to a particular Web advertisement based on the identity of a user, including, for example, the user's age and income. An advertiser might decide, for example, that different groups of users should see different advertisements, or that some groups should be allowed to view an advertisement for a longer period of time. The traditional browser/ISP interface does not let an ISP restrict access to URLs based on the user's identity, because, as explained below, the user's identity is not known.

All information sent over the Internet is tagged with the unique IP address of both the sender and the recipient. An IP address is usually expressed as four decimal numbers separated by periods. When a browser requests an HTML page, the request will include the browser's IP address and the recipient, such as an advertiser, can respond using the browser's IP address. A different IP address may be assigned to a computer on which the browser software is running each time the browser connects to the Internet, making the identity of the user invisible in the traditional browser/Web server arrangement. An advertiser could insist that a user provide personal information, such as demographic data or a password, when the user visits an advertisement Web page. Many users, however, are reluctant to provide this information over the Internet, and others will not bother to spend the time required by such a method.

Advertisers might also be interested in other information about users visiting an advertisement Web page. For example, a demographic profile of the average user who visits a Web page, or the average number of times each user returns to a particular Web site, could help advertisers determine the effectiveness of the content. As explained above, however, there is no way for an advertiser to match the IP address of an HTTP request to a user's demographic information. Moreover, an advertiser has only a limited ability to determine if a particular user has visited a Web page before. It is possible, for example, for the advertiser to store the fact that a particular computer has visited a Web page in a small file, called a "cookie," placed on the computer's disk drive. This feature, however, is not available in all browsers. Furthermore, many users simply delete cookie files or decide to disable the feature entirely. In addition, cookie files cannot track a single person's history when two different PCs are used, and similarly do not usually account for multiple people using a single PC.

To limit the cost of providing free access, an advertiser might want to limit access to advertisement Web pages to a limited period of time. Alternately, an advertiser may wish to limit the number of times a user can visit, and re-visit, an advertisement Web page. Such limitations could depend on demographic information associated with the user, the time of day the request is made, or any other factor important to the advertiser. Because an advertiser cannot match the IP address of an HTTP request to a user's identity, however, there is no way to implement such limitations.

In view of the foregoing, it can be appreciated that a substantial need exists for a method and apparatus for limiting access to information pages in a communications network based on a user's identity, and solving the other problems discussed above.

SUMMARY OF THE INVENTION

The disadvantages of the art are alleviated to a great extent by the method and apparatus to determine user identity and limit access to a communications network. A first message containing user identity information is received from a client computer in accordance with a first protocol. A first network address is determined from the first message. A second message containing an information request is also received from the client in accordance with a second protocol, and a second network address is determined from the second message. The requesting user identity is then determined based on the first network address, the user identity information and the second network address. Based on the requesting user identity, it can be decided whether to grant the information request. If access is granted, the requested information is retrieved using the communications network.

An embodiment of the present invention includes a proxy controller in communication with an access control proxy. The proxy controller includes a user identity database and a proxy control processor in communication with a client computer. The proxy control processor can receive from a client a first message containing user identity information. A first network address is determined from the first message.

The access control proxy includes a communications port capable of receiving information pages, such as Web pages, from the communications network. The access control proxy also includes a proxy processor able to receive a second message from the client including a request for an information page, such as a URL, and a second network address is determined from the second message. Based on the first network address, the user identity information and the second network address, the proxy processor in conjunction with the proxy control processor can decide whether to retrieve the requested URL from the Internet.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1A:
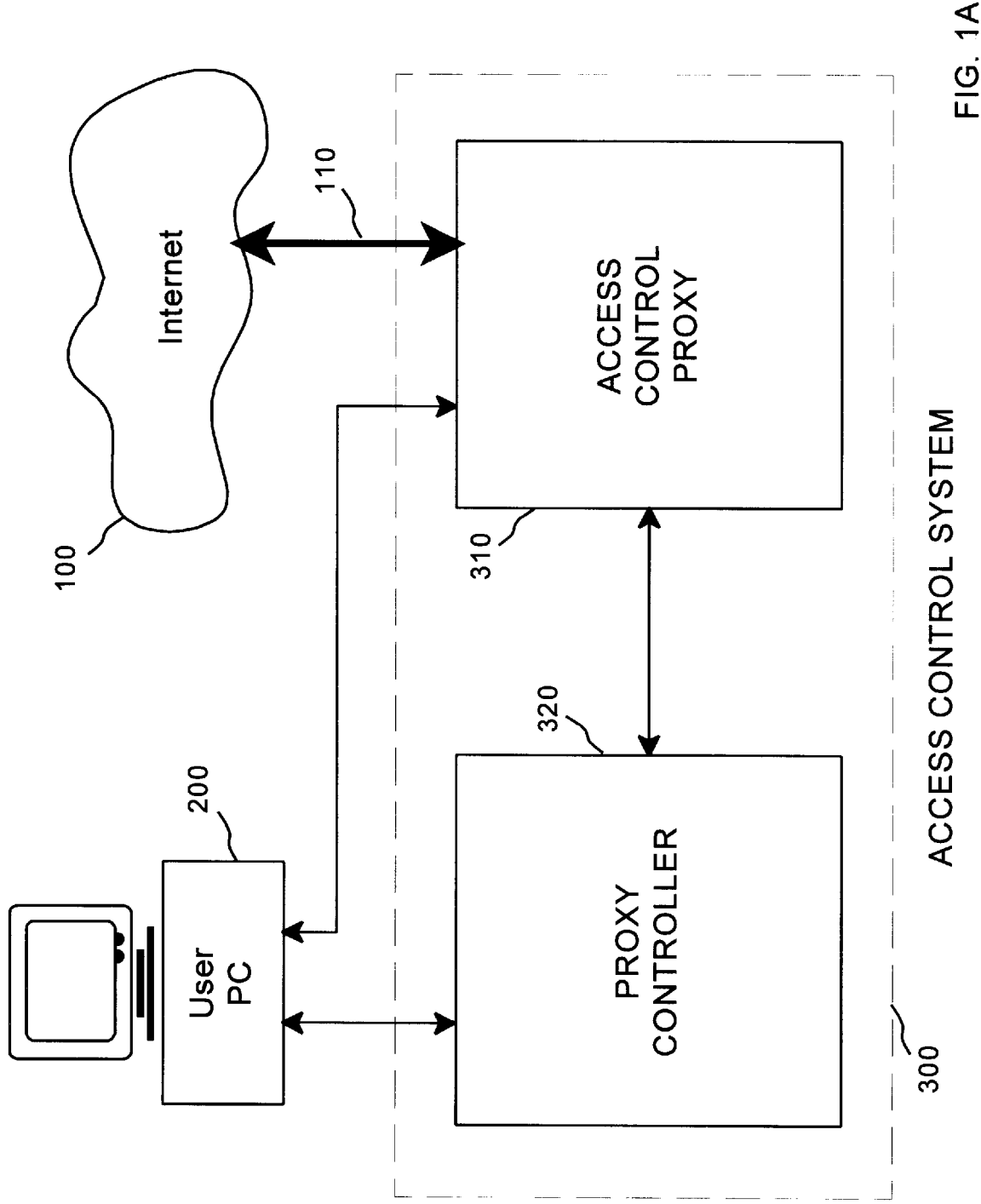
FIG. 1A is a block diagram of a system including an embodiment of the present invention.

The present invention is directed to a method and apparatus to determine user identity and limit access to a communications network. Referring now in detail to the drawings wherein like parts are designated by like reference numerals throughout, there is illustrated in FIG. 1A a block diagram of a system including an embodiment of the present invention. A user, or "client," computer 200, such as a PC, accesses the Internet 100 through an access control system 300. Note that although only a single client is shown in FIG. 1A, the present invention is capable of handling multiple clients.

In particular, the user PC 200 accesses the Internet 100 through an access control "Web proxy" 310 having a connection 110 to the Internet 100. As is well known in the art, a proxy is a computer system that traditionally acts on behalf of other Web servers by gathering all Internet requests from a number of clients, obtaining the requested information from the Internet, and forwarding the requested information to the appropriate clients. A proxy can be used, for example, in a company having a number of client terminals and a single point of access to the Internet. Such a proxy can also be configured to reduce network traffic by locally storing, or "caching," commonly downloaded information.

The user PC 200 also communicates with a proxy controller 320 in the access control system 300. As explained in detail below, the access control proxy 310 will only grant the user access to a limited set of Web pages. The set of Web pages that can be accessed will be based on information provided to the access control proxy 310 from the proxy controller 320.

Figure 1B:
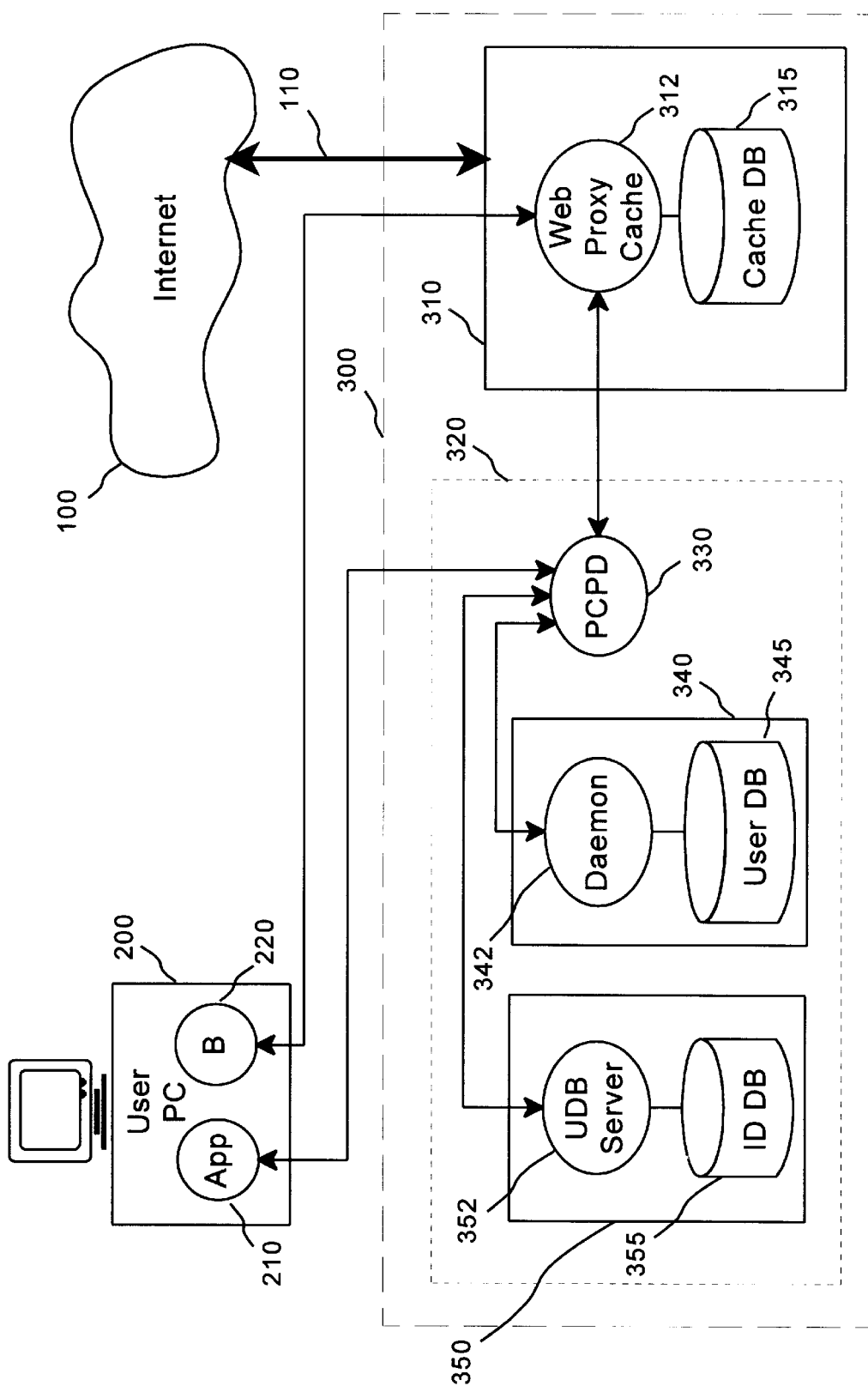
FIG. 1B is a more detailed block diagram of the system shown in FIG. 1A.
Figure 2:
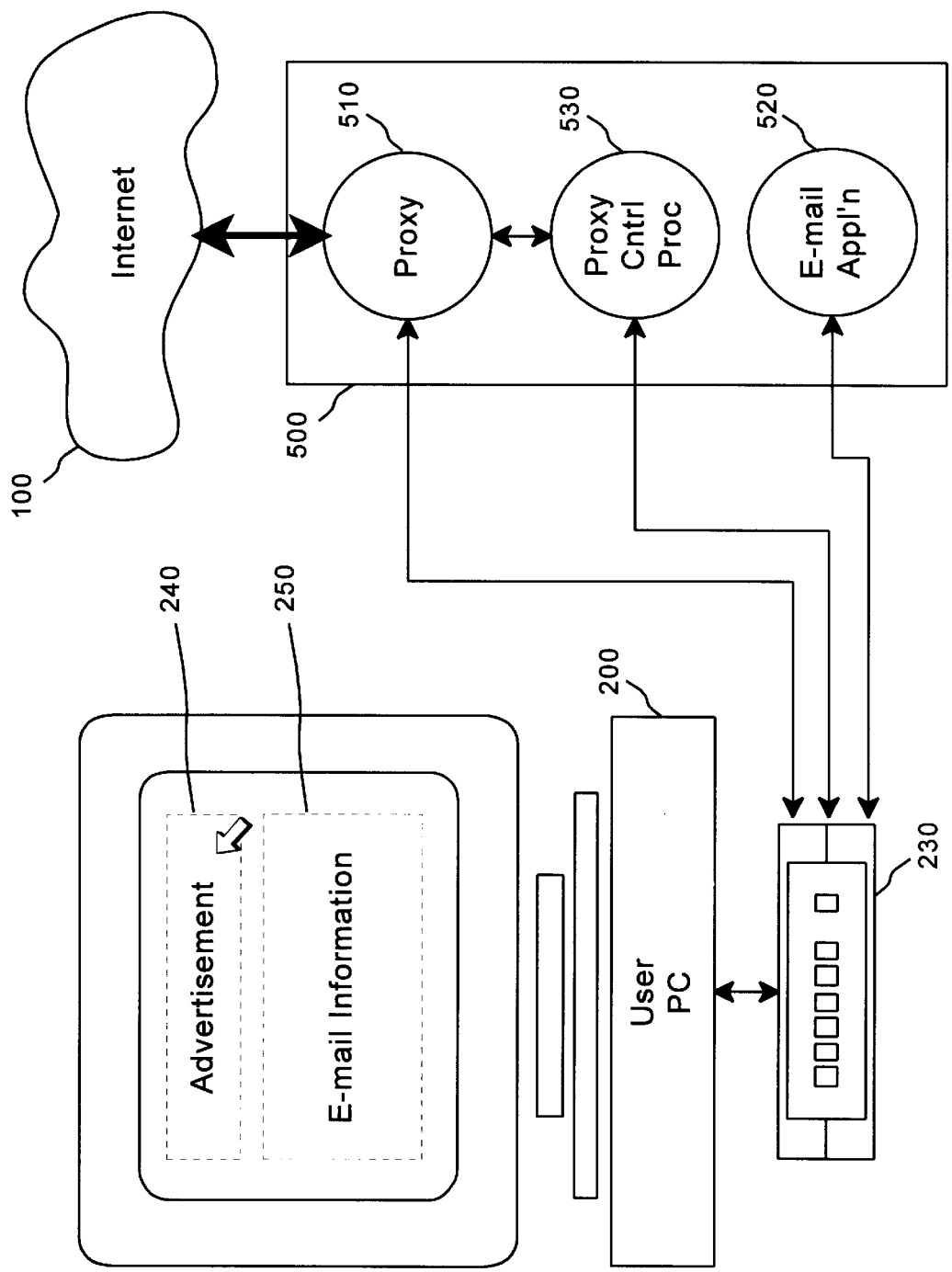
FIG. 2 is a block diagram illustrating an embodiment of the present invention using an e-mail system.

Illustratively, in FIG. 1B, a client access control application 210 could be implemented using an electronic mail system that displays targeted advertisements to remote users when the users are off line, such as the one described in U.S. Pat. No. 5,809,242 entitled "Electronic Mail System for Displaying Advertisement at Local Computer Received From Remote Site While the Local Computer is Off-Line the Remote System". Such an electronic mail (e-mail) system 500, including a server e-mail application program 520, is shown in FIG. 2. The e-mail application program 520 could, for example, briefly communicate with the user PC 200 through a modem 230 connected to a telephone line in order to download e-mail and advertising information. An advertisement banner 240 could then be constructed from the received advertising information. This banner 240 could be displayed while the user is reading the e-mail information 250—even if the user PC 200 is not in communication with the e-mail system 500.

The off-line user could select an advertisement from the banner 240 to automatically initiate the limited access to the Internet 100. The user PC 200 would request and receive Web page information through a Web proxy 510 and proxy control processor 530, and the Web page associated with the selected advertisement would be displayed. Although the user would be allowed to view a pre-determined list of related Web pages, other Web page requests would be rejected by the system 510, 530.

Thus, according to the present invention, a user's access to the Web will be restricted to a subset of the total number of information pages available. The subset can be different for each user, and can change over time. Referring now to FIG. 1B, which shows the system of FIG. 1A in greater detail, it is not practical to impose this restriction using software residing on the user PC 200. In particular, a user might alter software residing on the user PC 200, perhaps gaining unlimited access to the Internet 100. This risk is reduced with the use of the access control system 300, including an access control proxy 310 and a proxy controller 320. The access control proxy 310 will control all communication between the browser application 220 and the Internet 100. Again, although only a single client is shown in FIG. 1B, the present invention can handle any number of clients.

The user PC 200 includes a browser application 220. According to an embodiment of the present invention, the browser application 220 can be a standard off-the-shelf browser program, such as Netscape Navigator™, configured to access the Internet 100 through a proxy acting on behalf of other Web servers.

The client access control application 210 also resides on the user PC 200. The client access control application 210 can be used to initiate a Web browsing session. For example, the client access control application 210 can display an index of advertisements to a user. When the user selects an advertisement from the index, the client access control application 210 can activate the browser application 220 and obtain a Web page associated with that advertisement. As explained in detail below, the user will only be allowed to access the Web page, or group of Web pages, associated with that advertisement. If desired, the user can then select a different advertisement from the index and view its associated Web page or pages.

Because every request and response from the browser application 220 must pass through the proxy, the present invention uses proxy technology as a "choke point" to limit access to the Web. A proxy, such as an access control proxy 310, can selectively filter out portions of the Web by examining every Web request from the browser application 220 and applying decision logic based on the IP address of the user and the URL being requested. Only requests approved by the access control proxy 310 are retrieved from the Internet 100 through connection 110 and forwarded to the browser 220.

In order to use an unmodified third party Web browser 220, a standard IP network connection, such as one established using Point to Point Protocol (PPP), can link the access control proxy 310 with the user PC 200. The PPP account can have an IP address filter, making it impossible for the user PC 200 to connect to any service besides the access control proxy 310 and the proxy controller 320.

The access control proxy 310 decides if a particular URL request from the browser application 220 will be granted based on information from the proxy controller 320. In addition to displaying the advertiser index, the client access control application 210 communicates with the proxy controller 320. In particular, the client access control application 210 communicates with a Proxy Control Protocol Daemon (PCPD) 330 residing in the proxy controller 320, which also includes a user database system 350 and a daemon system 340. A "daemon" is a program that handles service requests by forwarding them to other programs, or processes, as appropriate. It should be noted that the user database system 350 and the daemon system 340 can easily be replaced by any database containing, for example, usage information, demographics and authentication information about individual users.

The only distinguishing piece of information regarding a request's origin that is carried with every Web request from the browser application 220 to the access control proxy 310 is the IP address assigned to the client by the ISP. This information is sufficient to identify related "hits" from a browsing "session," but the identity of the user remains concealed to the access control proxy 310 because a different IP address is assigned to each single client for each new session. This anonymity makes dynamic proxy access restrictions impossible to enact using a traditional Web client/proxy or client/server model.

Thus, according to an embodiment of the present invention, an out-of-band protocol called Proxy Control Protocol (PCP) is used to exchange information between the client access control application 210 and the PCPD 330, which operates in parallel with the access control proxy 310. The PCP information can be used to determine the identity of a user associated with an IP address. For example, a user's password can be authenticated by the PCPD 330 during the start of every Web browsing session, perhaps with the aide of the user database system 350 which includes a user database server 352 with access to a user identity database 355. The IP address associated with the authenticated user can then be used by the access control proxy 310 to associate that user with future Web page requests having the same IP address.

When the user selects an advertisement from the advertisement index, the client access control application 210 can send a request to PCPD 330, through the out-of-band PCP, to "add" the appropriate Web page, or Web pages, to an Access Control List (ACL) maintained by the access control proxy 310. The PCPD 330 informs the access control proxy of the change to the ACL for the IP address. The ACL can then be used to decide whether a Web page request from the browser application 220 with a particular IP address should be granted.

Because of the dynamic nature of the ACL for each user, an access control proxy 310 which bases access decisions on a static table is inadequate. Instead, an ACL can be maintained by the access control proxy 310 for each browsing session, which is identified by both the access control proxy 310 and the PCPD 330 using the IP address.

The access control proxy 310 can limit a user's Web access based on, for example, the identity of the user or the specific advertisement being requested. One type of restriction that may be imposed is based on the number of times, or the "frequency" that, a user may connect to a given site. For example, a user may be allocated a fixed number of connections for their lifetime, or over a fixed period of time. Thus, e.g., a user could be allocated a maximum of ten connections for each advertisement in the advertisement index. The user's demographics, such as age, income and residence, and the user's Web browsing history, such as how many times the user has visited a particular Web page or group of Web pages, can also be used to impose such a frequency restriction.

The amount of time, or "duration," a user can stay at any one site, or group of sites, is another type of restriction that may be imposed. A user could be allocated, for example, a fixed period of time for the user's lifetime, or for each browsing session. Thus, a user could be allocated a maximum of ten minutes for each advertisement in the advertisement index. The time restriction could also be modified, for example, to extend the fixed period of time, or to avoid an abrupt end to a session, when the user is downloading a large software file or is involved in another transaction which should be extended. For example, the user may be midway through the completion of an order form.

As with the frequency restriction, a user's demographics and history can be used to impose a duration restriction. The time of day, or day of the week, when a request is made can also be taken into account for either restriction. Client specific data, including the version of client access control application software, the Point-of-Presence (POP) location of the Internet connection and the version of browser application software being used could all be considered. Regardless of the type of restrictions imposed on users, either users or advertisers could be billed for use in excess of the limitation. If desired, a user's allocation could be periodically "reset," such as at the beginning of every month. Moreover, a combination of both frequency and duration, as well as other restrictions, are possible. For example, users between the ages of 25 and 35 could be allocated four visits, with each visit lasting no more than 10 minutes. Such limits can be applied to a single Web page, or a group of Web pages and different advertisers can impose different types of restrictions. The limitations are implemented by the PCPD 330 in conjunction with information, such as demographic or access history information for the particular user, stored in the user database 345.

Because the access control system 300 handles all Web requests from a client PC 200, and can associate each request with a user identity, the system can compile information about a user, or a group of users, and associated Web requests. Such information could be useful because advertisement rates could be based on the number of visitors to the URLs associated with the advertisement. Some advertisers will be interested in the number of visitors and their related demographic information. Other information about a particular user, or a group of users, that can be recorded and supplied to advertisers can include, for example, the times of all connections and the total time spent at each Web site.

Reports to advertisers based on the information recorded by the access control system 300 can also include demographic information about users or groups of user, such as the information that can be contained in the user database 345. This type of information could include, for example: gender; education; income; age; marital status; and number of children. The present invention also allows the total number of users who have requested a URL to be tracked. As some users may visit a site more than once, the total number of visits to a site can also be monitored, along with the average time spent at each site during each visit.

Figure 3:
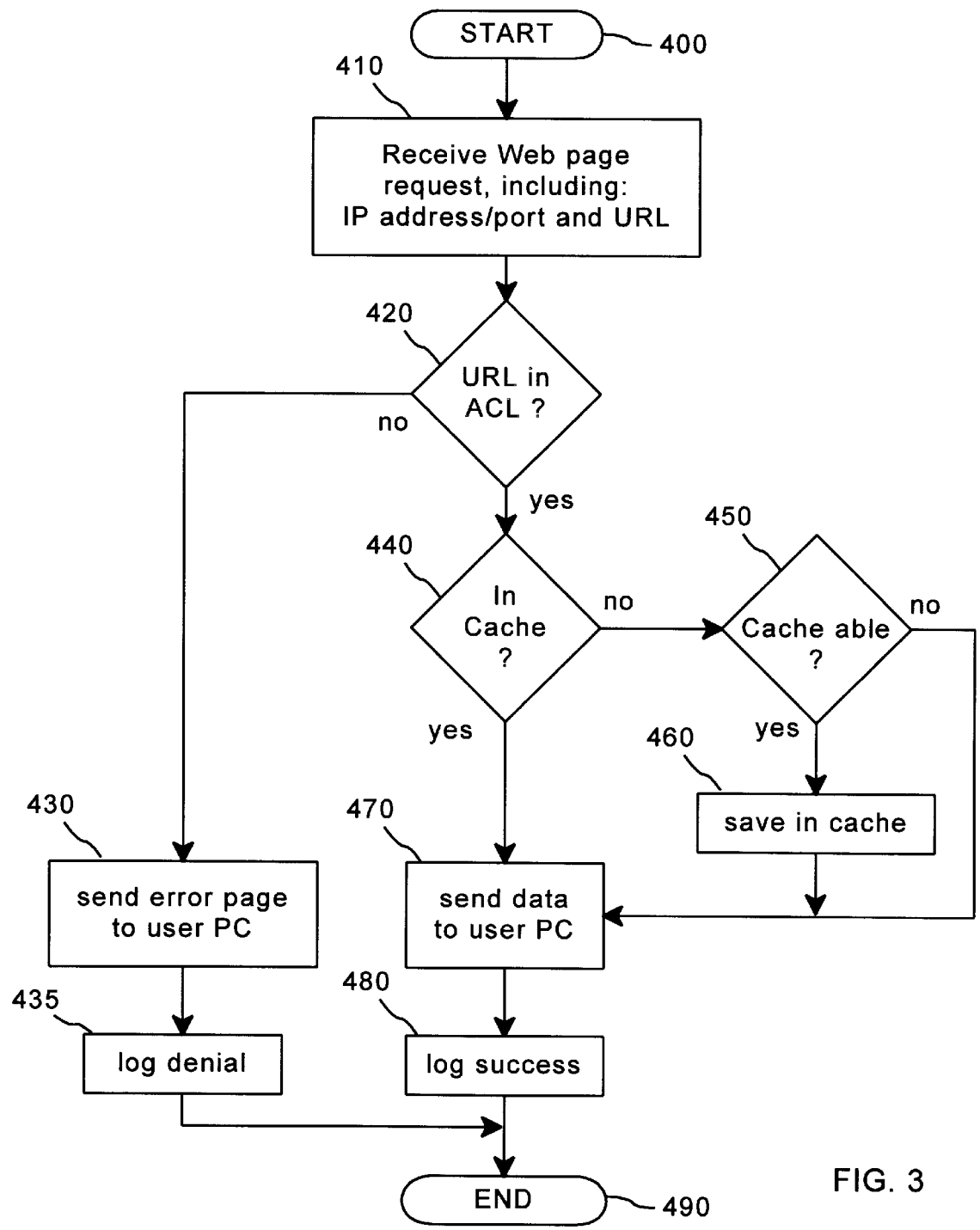
FIG. 3 is a flow diagram showing a process that can be used in an access control Web proxy according to an embodiment of the present invention.
Figure 4:
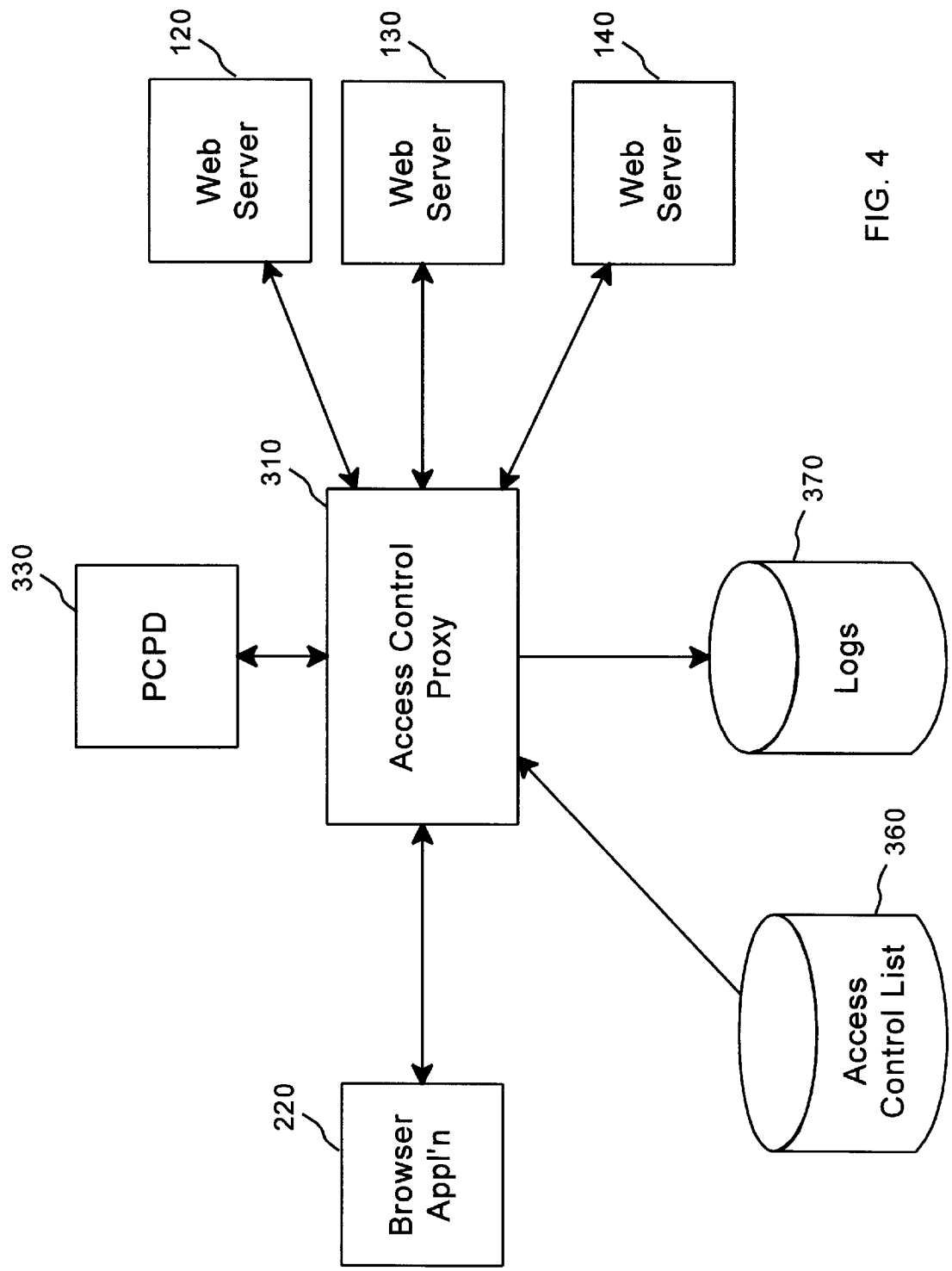
FIG. 4 is a block diagram showing functional components of an access control system according to an embodiment of the present invention.

In addition to granting a user restricted access to the Internet 100, the access control proxy 310 can cache content to reduce the amount of network traffic. This function is performed by a Web proxy cache 312, described in detail below with respect to FIG. 4, in communication with a cache database 315. FIG. 3 is a flow diagram showing a process that can be used for these functions according to an embodiment of the present invention. After beginning at step 400, the access control proxy receives a request from the browser application including an IP address and a requested URL at step 410. If the URL is not in the ACL associated with that IP address at step 420, an error page is sent to the user at step 430 and the denial is logged at step 435 before the process continues at step 490.

If the URL is in the ACL associated with that IP address at step 420, the system determines if the requested content has already been cached at step 440. When the access control proxy gets a request from the browser application, such as for a Web page or graphic, the information generally must be retrieved from the Internet and sent back to the browser application. Thus, the access control proxy can create twice as much network communication as a simple direct (non-proxy) HTTP transaction. To reduce this extra traffic, the access control proxy can save cacheable content on disk, skip the step of retrieving the information from the Internet, and respond immediately to a request from the browser application. Thus, if the content has been cached, it is provided to the user at step 470 and the successful request is logged at step 480 before the process continues at step 490.

If the content is not in the access control proxy cache, the system determines whether the requested information is "cacheable" at step 405. Although some content may not be cacheable, it can be expected that much of the information used in advertisement Web pages will be cacheable. If the information is not cacheable, it is simply retrieved and sent to the user as before. If the information is cacheable, the retrieved information is saved in the cache at step 460 before being sent to the user.

The basic purpose of the access control proxy 310 is to provide and record, or "audit," limited access to Web pages, such as advertisements, in response to requests from the browser application 210. According to an embodiment of the present invention, these and other tasks are performed using the functional components shown in FIG. 4.

To restrict and audit user activity as finely as possible, the access control proxy 310 can filter requests from a browser application 220 based on the advertisement that has been selected from the advertisement index. A different ACL 360 can be associated with each advertisement, and only URLs contained in the ACL 360 will be retrieved from Web servers 120, 130, 140 on the Internet. A successful request can be stored in a log 370 and the information can be supplied to the browser application 220 for display to the user. All other URL requests can simply be denied, and the denials can also be stored in a log 370.

Because the client access control application communicates with the PCPD 330, the PCPD 330 knows which advertisement has been selected by a user from the advertisement index, and therefore which ACL 360 is appropriate. The PCPD 330 also knows the IP address of that user. This information is provided to the access control proxy 310. In summary, the PCPD 330 tells the proxy each user's name, IP address and the ACL that contains the URLs the user is allowed to browse.

The access control proxy 310 correlates each Web request from the browser application 220 with an appropriate user, and an appropriate ACL 360, based on the IP address contained in the Web request. If there is no match between the URL requested by the user and the ACL 360 for that user, the request is denied and logged. Otherwise, the request is served, and the corresponding user and advertisement information are logged. Eventually, timers or other restrictions maintained by the PCPD 330 may instruct the access control proxy 310 to reject all further requests from that user, i.e. from a specific IP address.

An embodiment of the present invention employs a Web proxy cache which can process Internet data while transparently streaming the data from Web servers 120, 130, 140 to the browser application 220. The Web proxy cache also handles connections to the PCPD and reads information from either a database or a file associating each advertiser with a corresponding ACL. The ACL can include the IP address, mask, and port-range of approved Web pages and can be stored in a hash table keyed on the advertiser. The access control proxy 310 keeps track of users as "sessions" and stores a hash table of sessions, keyed on the IP address associated with a user. Each session also has an ACL listing permissible URLs. An administrative Web page URL, which could permit a user to visit certain Web pages related to system errors, etc., can be included in every ACL.

Figure 5:
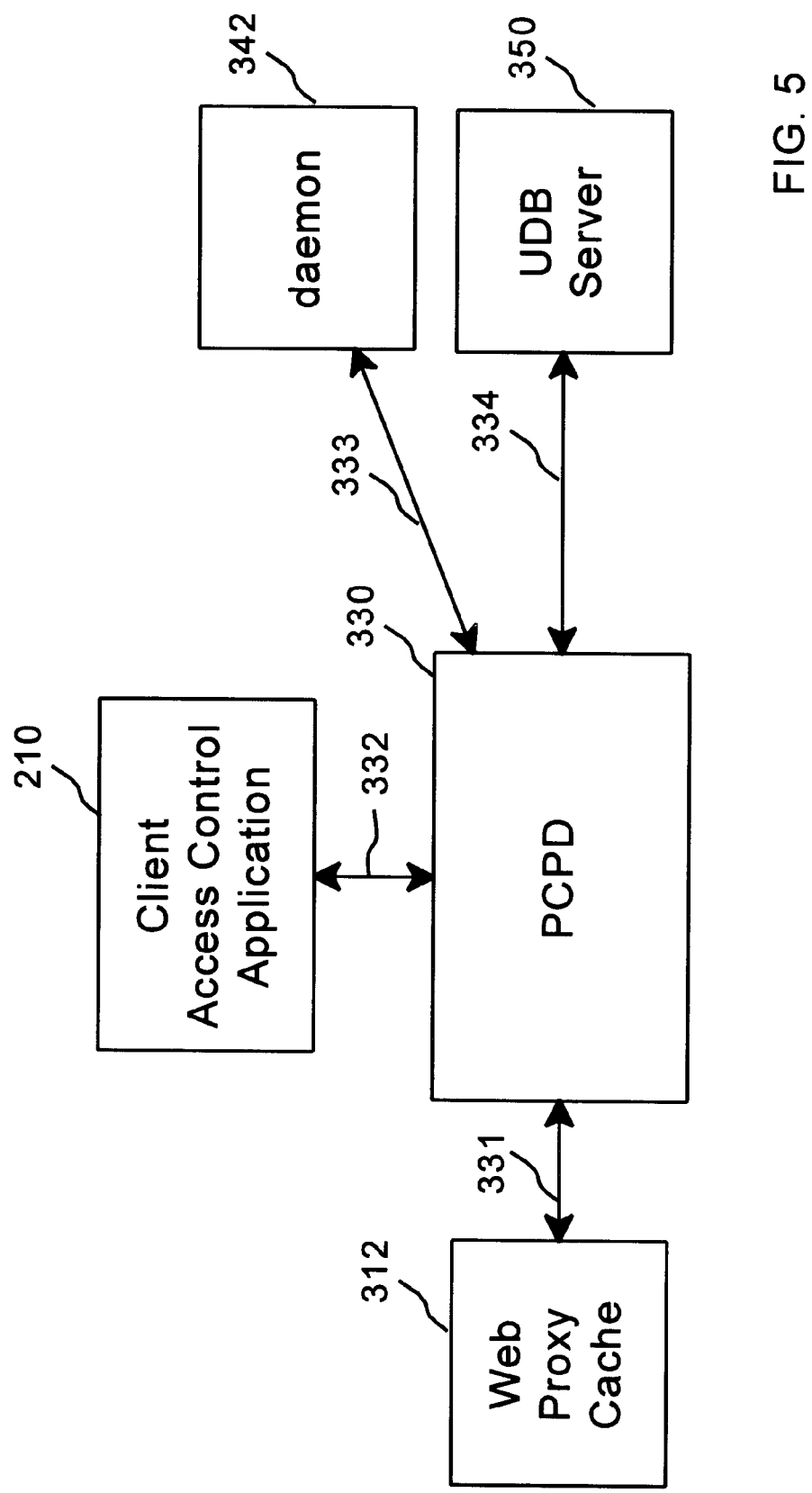
FIG. 5 is a block diagram showing communications involving a proxy control protocol daemon according to an embodiment of the present invention.

The PCPD 330 will now be described in detail with respect to FIG. 5, a block diagram showing communications involving the PCPD 330 according to an embodiment of the present invention. The client access control application 210 communicates 332 with the PCPD 330 to start a new session, transferring state information about the current connection such as machine identification number, user name, Point of Presence (POP) number, advertisement identification number, connection media type, etc. The PCPD 330 communicates 334 with a user database to authenticate the person using, for example, a time stamp, session unique identifiers and the user's password, which can be queried from a User Database (UDB) server 350. If authentication passes, a message 331 is sent to the Web proxy cache 312 telling it to grant access to the URLs associated with the selected advertisement for the IP address in use by the client, by instantiating appropriate ACLs for the session. The URLs allowed for a particular advertiser are predetermined by the access control proxy from a database of advertisers and associated ACLs. An advertisement startup procedure can be run and the time remaining that a user may spend at the current advertiser's URLs is sent back to the client.

An example PCPD 330 startup procedure will now be described. When a user selects an advertisement from the advertisement index, that user is queried from a user database to find any data describing previous interactions with that particular advertisement. The information is stored in the user database and variables such as the number of visits and total time viewing an advertisement are set in an advertiser specific startup procedure. The remaining time left for the current user for the selected advertisement can then be calculated.

An example PCPD 330 shutdown procedure will now be described. The client access control application 210 shuts down a session by sending a shutdown message to the PCPD 330, which is authenticated in a similar fashion to the session start message. Once a shutdown message has been authenticated, the access control proxy 310 is told to clear all ACLs for the client's IP address. All traces of the session being shutdown are removed from PCPD after an advertisement specific shut down procedure is run.

At the end of an interaction with a particular advertisement, the same variables that were used in the startup procedure can be updated in the shutdown procedure. These variables can then be written back to a user database for future reference. The shutdown procedure also calculates whether an advertisement should be permanently removed from that client's advertisement index. If required, the PCPD 330 can instruct the client access control application 210 to disable the particular advertisement in the index.

To illustrate an embodiment of the present invention, the following lines of software code implement a sample advertisement startup and shutdown function suitable for use by the PCPD 330 with respect to a user allowed to visit an ACL a maximum of 5 times, for 5 minutes at a time:

```
proc startrule_visits { } {
    global Rule_Vars
    lassign $Rule_Vars visits
    if { $visits < 5 } {
        return 300
    } else {
        return 0
    }
}
proc endrule_visits { } {
    global Rule_Vars
    lassign $Rule_Vars visits
    set visits [expr $visits + 1]
    set Rule_Vars [list $visits]
    if { $visits >= 5 } {
        return -1
    } else {
        return 0
    }
}
```

Further illustrating an embodiment of the present invention, the following lines of software code implement a sample advertisement startup and shutdown function suitable for use by the PCPD 330 with respect to a user allowed to visit an ACL an unlimited number of times, for a total of 20 minutes:

```
proc startrule_maxtime { } {
    global Rule_Vars
    lassign $Rule_Vars time
    if { $time < 1200 } {
        return [expr $time - 1200]
    } else {
```

```
                return 0
            }
        }
    }
    proc endrule_maxtime { } {
        global Rule_Vars Time_Elapsed
        lassign $Rule_Vars visits
        set time [expr $time + $Time_Elapsed]
        set Rule_Vars [list $time]
        if { $time >= 1200 } {
            return -1
        } else {
            return 0
        }
    }
```

If a user picks a new advertisement from the advertisement index, the client access control application 210 sends a message to the PCPD 330, which essentially runs the ad related shutdown and startup procedures for the old and new advertisements respectively. The PCPD 330 then sends messages to the access control proxy to remove and install the proper ACLs. The PCPD 330 also has the ability to tear down the client's connection at any time by telling the access control proxy 310 to remove all ACLs for the client's IP address, and going through the advertiser shutdown sequence. This can happen from either the initial advertisement or any subsequent advertisement. The user PC 200 can be notified of the tear down via a message from the PCPD 330 to the client access control application 210.

In summary a method and apparatus for correlating user identity with requests for information for the purpose of limiting access to information pages in a communications network has been described.

What has been described is merely illustrative of the application of the principles of the present invention. Other arrangements and methods can be implemented by those skilled in the art without departing from the spirit and scope of the present invention.

Moreover, although various embodiments are specifically illustrated and described herein, it will be appreciated that modifications and variations of the present invention are covered by the above teachings and within the purview of the appended claims without departing from the spirit and intended scope of the invention. For example, although a separate proxy controller and access control proxy are described in detail herein, it can be appreciated that any system or systems performing the same functions will still fall within the scope of the invention.

What is claimed is:

1. A method of operating an access control system for information retrievable using a communications network, comprising the steps of:

receiving at the access control system from a client a first message containing user identity information in accordance with a first protocol, wherein a first network address can be determined from the first message;

receiving at the access control system from the client a second message containing an information request in accordance with a second protocol, wherein a second network address can be determined from the second message;

determining at the access control system a requesting user identity based on the first network address, the user identity information and the second network address;

deciding at the access control system whether to grant the information request based on the requesting user identity; and if the information request was granted, then:
    retrieving by the access control system the requested information using one of:
        the communications network; and
        a cache; and
    sending by the access control system the retrieved information to the client.

2. The method of claim 1, wherein the communications network is a packet network.

3. The method of claim 1, wherein the client is a computer located remote from the access control system.

4. The method of claim 1, wherein said step of deciding is also based on information stored in a user database.

5. The method of claim 1, wherein the information request is a request to retrieve an information page.

6. The method of claim 5, wherein the communications network is the Internet, the information page is a World Wide Web page and the first and second network addresses are Internet protocol addresses.

7. The method of claim 5, further comprising the step of:
recording user history data based on the information page requests made by the requesting user identity.

8. The method of claim 7, further comprising the step of:
reporting composite history data based on recorded user history data for a plurality of requesting user identities.

9. The method of claim 5, wherein said step of deciding is also based on an access control list of information pages.

10. The method of claim 9, wherein said step of deciding is also based on at least one of:
the number of requests for the information page that have previously been associated with the requesting user identity;
the amount of time the information page has previously been displayed to the requesting user identity; and
demographic information associated with the requesting user identity.

11. The method of claim 5, wherein the second message is received in accordance with hypertext transfer protocol and the first message is received in accordance with a protocol other than hypertext transfer protocol.

12. The method of claim 1, further comprising the step of storing the requested information in a cache.

13. The method of claim 1, wherein said steps of receiving a second message and retrieving are performed by a proxy.

14. The method of claim 1, wherein the first message also includes credential information and further comprising the step of deciding whether the client is authorized to use the access control system based on the credential information and a user credential database.

15. The method of claim 1, wherein said step of determining is based on user identity information associated with the first network address when the first network address has been determined to be the same as the second network address.

16. An apparatus for limiting information retrievable using a communications network, comprising:
a proxy controller, comprising:
    a user identity database,
    a proxy control processor, in communication with a client and said user identity database, configured to receive from the client a first message containing user identity information, wherein a first network address can be determined from the first message; and
an access control proxy in communication with said proxy controller, comprising:

a communications port capable of receiving information page data using the communications network, and a proxy processor, in communication with the client and said communications port, configured to receive from the client a second maessage containing a request for an information page, wherein a second network address can be determined from the second message and said proxy processor is configured to decide whether to retrieve the associated information page data from said communications port based on the first network address, the user identity information and the second network address and if the information request was granted, then:
said proxy processor configured to retrieve the associated information page from one of:
said communications port; and
a cache; and
said proxy processor configured to send the retrieved information page to the client.

17. The apparatus of claim 16, wherein said proxy processor is configured to use a Web proxy cache.

18. The apparatus of claim 16, wherein said proxy processor communicates with the client using a first protocol and said proxy processor communicates with the client using a protocol other than the first protocol.

19. The apparatus of claim 16, wherein the communications network is a packet network.

20. The apparatus of claim 16, wherein the communications network is the Internet, the information page is a World Wide Web page and the first and second network addresses are Internet protocol addresses.

21. The apparatus of claim 16, wherein the access control proxy further comprises:
a request history storage unit in communication with the proxy processor, said proxy processor storing information related to information page requests in said request history storage unit.

22. The apparatus of claim 16, wherein said proxy processor is also configured to decide whether to grant access based on an access control list of information pages.

23. The apparatus of claim 16, wherein said proxy processor is also configured to determine a requesting user identity based on the first network address, the user identity information and the second network address, and said proxy controller is further configured to decide whether to grant access based on at least one of the following:
the number of requests for the information page that have previously been associated with the requesting user identity;
the amount of time the information page has previously been displayed to the requesting user identity; and
demographic information associated with the requesting user identity.

24. A computer readable medium having stored thereon instructions which, when executed by a processor, cause the processor to perform steps for operating an access control system for information retrievable using a communications network, said steps comprising:
receiving at the access control system from a client a first message containing user identity information in accordance with a first protocol, wherein a first network address can be determined from the first message;
receiving at the access control system from the client a second message containing an information request in accordance with a second protocol, wherein a second network address can be determined from the second message;
determining at the access control system a requesting user identity based on the first network address, the user identity information and the second network address;
deciding at the access control system whether to grant the information request based on the requesting user identity; and
if the information request was granted, then:
retrieving by the access control system the requested information using one of:
the communications network; and
a cache; and
sending by the access control system the retrieved information to the client.

25. An apparatus for operating an access control system for information retrievable using a communications network, comprising:
means for receiving at the access control system from a client a first message containing user identity information in accordance with a first protocol, wherein a first network address can be determined from the first message;
means for receiving at the access control system from the client a second message containing an information request in accordance with a second protocol, wherein a second network address can be determined from the second message;
means for determining at the access control system a requesting user identity based on the first network address, the user identity information and the second network address;
means for deciding at the access control system whether to grant the information request based on the requesting user identity; and
if the information request was granted, then:
means for retrieving by the access control system the requested information using one of:
the communications network; and
a cache; and
means for sending by the access control system the retrieved information to the client.

26. A method of operating an access control system for information retrievable using a communications network, said access control system communicating with a plurality of clients, comprising the steps of:
receiving at the access control system from a first client of the plurality of clients a first message containing information identifying a first user in accordance with a first protocol, wherein a first network address can be determined from the first message and wherein the first network address and the information identifying the first user is stored in a database;
receiving at the access control system from a second client of the plurality of clients a second message containing information identifying a second user in accordance with a first protocol, wherein a second network address can be determined from the second message and wherein the second network address and the information identifying the second user is stored in the database;
receiving at the access control system from one of the first client and the second client a third message containing an information request in accordance with a second protocol, wherein a third network address can be determined from the third message;
determining at the access control system a requesting user identity based on the third network address, the stored user identifying information and the stored network addresses;

deciding at the access control system whether to grant the information request based on the requesting user identity; and if the information request was granted, then:
  retrieving by the access control system the requested information using one of:
    the communications network; and
    a cache; and
  sending by the access control system the retrieved information to the client.

27. The method of claim 26, wherein the communications network is a packet network.

28. The method of claim 26, wherein the information request is a request to retrieve an information page.

29. The method of claim 28, wherein said step of deciding is also based on at least one of:

the number of requests for the information page that have previously been associated with the requesting user dentity;

the amount of time the information page has previously been displayed to the requesting user identity; and demographic information associated with the requesting user identity.

30. The method of claim 29, wherein said steps of receiving the third message and retrieving are performed by a proxy.

31. The method of claim 30, wherein said step of determining is based on user identity information associated with the first network address when the first network address has been determined to be the same as the third network address.

* * * * *